United States Patent
Gever et al.

(10) Patent No.: US 6,351,267 B1
(45) Date of Patent: Feb. 26, 2002

(54) FAST TRANSMISSION OF GRAPHIC OBJECTS

(75) Inventors: Eyal Gever, Tel Aviv; Racheli Avigur, Kfar Saba; Tomer Avraham; Orit Bergman, both of Tel Aviv; Sharon Dotan, Givat Shmuel; Guy Friedman, Tel Aviv; Doron Gill, Givatayim; Nir Hermoni, Or Yehuda; Eilon Reshef, Tel Aviv; Eran Segal, Tel Aviv; Amira Solomovici, Tel Aviv; Gil Tayar, Givatayim, all of (IL)

(73) Assignee: Gizmoz LTD, Tel Aviv (IL)

( * ) Notice: Subject to any disclaimer, the term of this patent is extended or adjusted under 35 U.S.C. 154(b) by 0 days.

(21) Appl. No.: 09/209,385

(22) Filed: Dec. 10, 1998

(51) Int. Cl.[7] .......................... G06T 11/00; G06T 13/00
(52) U.S. Cl. ...................................... 345/473; 345/619
(58) Field of Search ................................. 345/473, 433

(56) References Cited

U.S. PATENT DOCUMENTS

| 4,600,919 A | 7/1986 | Stern .......................... 345/473 |
| 5,267,154 A | 11/1993 | Takeuchi et al. ............ 345/473 |

(List continued on next page.)

FOREIGN PATENT DOCUMENTS

| EP | 753834 A2 | * | 1/1997 | ............ G06T/15/00 |
| EP | 0 753 834 | | 1/1997 | |
| EP | 0 774 722 | | 5/1997 | |
| EP | 0 804 032 | | 10/1997 | |
| EP | 804032 A2 | * | 10/1997 | ............ H04N/7/24 |
| EP | 0 841 615 | | 5/1998 | |
| WO | WO9735280 | | 9/1997 | |
| WO | WO 97/35280 | | 9/1997 | |
| WO | WO 98/46005 | | 10/1998 | |
| WO | WO 98/46024 | | 10/1998 | |
| WO | WO 98/53406 | | 11/1998 | |

OTHER PUBLICATIONS

Singh, K. et al., "Human Figure Synthesis and Animation for Virtual space Teleconferencing", Proc. Virtual Reality Annual International Symposium, 1995, IEEE, pp. 118–126.
Stempson, G., "Database Management: New Generation Systems Speed Graphics' Role", *Computer Graphics World*, Apr. 1986, pp. 51–56.
Palumbo, P., "Fixing Interactive Entertainment", *BRP Publications*, Jan. 1997, vol. 4, No. 1, pp. 1–2.

*Primary Examiner*—Mark R. Powell
*Assistant Examiner*—Jeffrey Allen Rossi
(74) *Attorney, Agent, or Firm*—Abelman, Frayne & Schwab (57) ABSTRACT

A method for rendering an animation object, including a plurality of sub-objects, on a display of a client computer under control of a remote server. The method includes transferring from the server to the client, program code which describes a structure of the object, accessing within a local memory associated with the client a program description of at least one of the sub-objects of the object, and displaying the object such that the sub-object is coupled to the structure in accordance with the program code.

15 Claims, 4 Drawing Sheets

U.S. PATENT DOCUMENTS

| | | | |
|---|---|---|---|
| 5,347,306 A | 9/1994 | Nitta | 345/473 |
| 5,483,630 A | 1/1996 | Unuma et al. | 345/475 |
| 5,511,158 A | 4/1996 | Sims | 345/440 |
| 5,566,294 A | 10/1996 | Kojima et al. | 345/866 |
| 5,583,994 A | 12/1996 | Rangan | 709/219 |
| 5,592,626 A | 1/1997 | Papadimitriou et al. | 709/219 |
| 5,649,086 A | 7/1997 | Belfer et al. | 345/473 |
| 5,655,067 A | 8/1997 | Takahashi et al. | 345/473.2 |
| 5,659,692 A | 8/1997 | Poggio et al. | 345/756 |
| 5,727,129 A | 3/1998 | Barrett et al. | 345/841 |
| 5,751,286 A | 5/1998 | Barber et al. | 345/348 |
| 5,754,190 A * | 5/1998 | Dutton et al. | 345/473 |
| 5,818,463 A | 10/1998 | Tao et al. | 345/473 |
| 5,848,291 A | 12/1998 | Milne et al. | 345/709 |
| 5,877,778 A | 3/1999 | Dow et al. | 345/474 |
| 5,931,906 A | 8/1999 | Fidelibus, Jr. et al. | 709/217 |
| 5,963,217 A * | 10/1999 | Grayson et al. | 345/473 |
| 5,983,220 A | 11/1999 | Schmitt | 707/5 |
| 5,991,798 A | 11/1999 | Ozaki et al. | 709/217 |
| 5,999,944 A | 12/1999 | Lipkin | 345/502 |
| 6,038,258 A | 3/2000 | Chun et al. | 375/240.18 |
| 6,118,456 A * | 9/2000 | Cooper | 345/619 |
| 6,144,996 A * | 11/2000 | Starns et al. | 709/217 |
| 6,157,933 A * | 12/2000 | Celi, Jr. et al. | 707/501 |
| 6,208,357 B1 * | 3/2001 | Koga et al. | 345/473 |

\* cited by examiner

FAST TRANSMISSION OF GRAPHIC OBJECTS

FIELD OF THE INVENTION

The present invention relates generally to computer animation, and specifically to interactive rendering of computer graphic objects from a remote source.

BACKGROUND OF THE INVENTION

In recent years, the use of the World Wide Web (WWW) has been rapidly growing. In use of the WWW, a client computer user connects to a Web site on a server and requests that the server download and display Web pages on the client computer. In response to the request, the server sends to the client computer graphic files, which include media elements (pictures, animations, texts, sound), scripts of instructions to be performed by an Internet browser program running on the computer, and in some cases executable software code, e.g., Java code. In addition, the server usually sends a file in HTML format which describes the layout of the computer graphic files on the screen. Generally, the Internet browser program operates independently of other programs on the client computer and, in particular, limits the access of scripts from the server to files stored in the memory of the client computer, and especially to graphic objects stored in the memory.

In order to attract users, sites must be interesting, and it is typically desired that sites display graphics and animation. However, the time required to download and display Web pages which include animation, including three-dimensional (3D) animation, on the client computer is relatively large, which is inconvenient to users and may discourage them from using such sites. Frequently it is desired to render animated advertisements along with user-chosen data from a Web site. Such advertisements must not require long transmission periods, or the visitor at the site may leave the site and be discouraged from returning.

Various compression methods have been suggested to reduce the data volume of a transmitted Web page and thus reduce the amount of time required to display the page on the computer. However, even using such compression methods, available network transmission bandwidth is typically still much lower than required to transmit large high quality animation streams. The users therefore must either settle for reduced quality of the animation stream or limit its size and/or length. In addition, some compression methods require lengthy decompression, which wastes much of the time saved by the compression.

Another method, referred to as caching or data pushing, described, for example, in U.S. Pat. No. 5,727,129, which is incorporated herein by reference, includes "pushing" data in advance while the connection of the client computer to the network is idle. The computer, or the server, chooses data which may be of interest to the user and sends this data to the computer in advance of a specific request from the user, while the connection is idle. However, in many cases, there is no way to predict what the user will want to see. The number of Web pages which may be stored on the computer is limited, and the user may want updated versions of the page. Furthermore, there is not always an idle line available for significant periods of time.

Some Web browsers allow server-originated code to access the hard disk of the computer running the browser. Such access is normally performed using programs known as "plug-ins" or ActiveX controls. In most cases, when such access is attempted, the user of the computer is typically warned of a potential security violation, arising from such access.

SUMMARY OF THE INVENTION

It is an object of the present invention to provide improved methods and apparatus for fast rendering of an animation object, preferably a three-dimensional (3D) object, on a remote computer graphic display.

In preferred embodiments of the present invention, an animation image of an object comprises a set of sub-objects (also referred to herein as elements) which are arranged in a predetermined hierarchy and animated responsive to the hierarchy. A structure record (also referred to as a "skeleton") describes relationships between the sub-objects in the hierarchy. Preferably, the structure record is written in accordance with a common script language, such as JavaScript. A plurality of sub-object records describe the sub-objects. At least some of the sub-object records are stored in a local memory associated with a client computer.

When the animation image is to be rendered on a display associated with the client computer, a server sends the structure record describing the animation image to the client computer, together with required sub-object records, if any, which are not stored in the client computer's local memory. Typically, only the structure record and a minimal number of sub-object records need be sent from the server. Thus, in most cases remote rendering of animation objects requires relatively low bandwidth, since the heavy graphical parts of the objects are stored permanently in the memory associated with the client computer.

In the context of the present patent application, the term "object" is used to refer to a modular, graphic and/or mathematical description of an image (generally a representation of a physical object, which may be naturalistic or fanciful). The skeleton of the object preferably defines the parts of the object and the joints connecting those parts. The hierarchical structure of objects allows a user to exchange sub-objects between objects that share a common hierarchy.

In some preferred embodiments of the present invention, the object represents a human, humanoid or animal character, and the sub-objects describe organs (such as limbs) and sub-organs (such as parts of the limbs) of the character. Other optional sub-objects describe attributes such as sound and rules governing behavior of the object, such as motions of the image.

Preferably, the objects also include sub-objects that define their response to sensitivity conditions that may arise externally to the object itself, such as the presence of other objects in the computer display. Furthermore, objects may include sub-objects that have learning capabilities, as are known in the art, whereby the behavior of the object is modified adaptively in response to inputs from the computer-animated environment. Preferably, some of the sub-objects are themselves formed of other sub-objects. In a preferred embodiment of the present invention, the objects comprise Smart Objects as are described in PCT publication WO97/35280, which is incorporated herein by reference.

Preferably, the client computer runs a scene manager program, which displays the animated images on a screen associated with the client computer. The scene manager is preferably part of a Web browser, which downloads graphic pages from a network. The client computer preferably also runs an element manager program, which keeps track of the locations of the records of sub-objects stored on the client computer. The scene manager interacts with the element manager to properly render the object using the received records and the stored records.

Preferably, the element manager maintains a look-up table which is used to find the location in the memory of sub-objects referenced by the received structure record. Most preferably, the element manager receives the name of a desired sub-object and returns a pointer to the stored location of the object based on the name. If the desired sub-object in not held in the memory of the client computer, the element manager returns a negative answer. Alternatively or additionally, the element manager orders the requested element from the server and provides the scene manager with a pointer to an input directory in which received sub-objects are stored.

In some preferred embodiments of the present invention, the element manager is included within the Web browser. Thus, the user does not need to install any "plug-in" to the browser. Preferably, the browser as supplied to the client computer includes a set of records describing commonly-used sub-objects. Most preferably, the browser and set of records are pre-installed in a computer with dedicated three-dimensional graphics capabilities.

In some preferred embodiments of the present invention, when a sub-object not already in the memory is received by the client computer, the sub-object is stored in the memory and its address is added to the look up table.

In some preferred embodiments of the present invention, when a server instructs the client computer to render a new object, the server sends the computer a list of the sub-objects to be used in constructing the transmitted object, and the computer responds with a list of the sub-objects which the computer has and/or with a list of the sub-objects which the computer does not have. The server responds by sending the sub-objects missing from the client computer. Preferably, while waiting for the computer's response, the server sends the structure record and/or records describing sub-objects which are least likely to be already stored in the memory of the computer.

Preferably, when a computer responds that it does not have a copy of a sub-object which itself is formed of sub-sub-objects, the server sends a second list which lists the sub-sub-objects which form the sub-object and requests that the computer identify those sub-sub-objects which it does not have. This process may continue for the sub-sub-objects until there are no further sub-objects or until the records describing the sub-objects are so small that it is simpler to send the records, rather than to ask if they are needed. Alternatively or additionally, the server only asks the client computer about sub-objects for which there is a high probability that the computer has records describing its sub-sub-objects.

Alternatively or additionally, the client computer determines the required sub-objects from the received structure record. Preferably, the JavaScript of the structure record describes the animation conditionally, based upon the presence or lack of sub-objects in the client computer. The JavaScript preferably uses "If-Then" directives to reference the sub-objects, wherein a referenced sub-object is first accessed in the local memory using the element manager, and if it is not found in the local memory, the sub-object is requested from the server either by the scene manger or by the element manager.

There is therefore provided in accordance with a preferred embodiment of the present invention, a method for rendering an animation object, including a plurality of sub-objects, on a display of a client computer under control of a remote server, the method includes transferring from the server to the client, program code which describes a structure of the object, accessing within a local memory associated with the client a program description of at least one of the sub-objects of the object, and displaying the object such that the sub-object is coupled to the structure in accordance with the program code.

Preferably, the method includes reporting to the server the identity of at least some of the sub-objects stored in the memory.

Preferably, reporting the identity of the sub-objects includes receiving a list of sub-objects from the server and reporting on a correspondence between the list and the sub-objects that are stored in the memory.

Preferably, the method includes transferring from the server to the client descriptions of sub-objects not already stored in the memory and storing the transferred descriptions in the memory.

Preferably, at least some of the sub-objects include sub-sub-objects, and transferring descriptions of the sub-objects includes transferring only those sub-sub-objects not stored in the memory.

Preferably, the method includes storing in the memory a plurality of descriptions of sub-objects when installing a browser on the computer.

Preferably, accessing the at least one description includes looking up the location of the description in the memory in a look-up table.

Preferably, accessing the at least one description includes receiving an exact location of the description from an element manager and accessing the exact location.

Preferably, the object includes a three dimensional graphical object.

Preferably, at least some of the sub-objects include graphical descriptions of parts of the object.

Preferably, at least some of the sub-objects include sound modules.

Preferably, accessing the program description of at least one of the sub-objects includes calling a routine which returns the address of the object in the local memory.

Preferably, transferring the program code includes transferring a script which references the sub-objects in the local memory and if the object is not found in the local memory, references the sub-object in an input location.

There is Further provided in accordance with a preferred embodiment of the present invention, apparatus for rendering an image of an animation object under control of a remote server, the apparatus includes a memory, which stores descriptions of sub-objects which are used to form the objects, an animation generator, linked locally to the memory, which receives a skeleton which describes a structure of the object and retrieves the descriptions of at least some of those sub-objects from the memory, and a display on which the image is displayed by rendering the sub-objects responsive to the descriptions thereof and responsive to the skeleton.

Preferably, the object includes a three dimensional object.

Preferably, the memory includes a look up table which lists the sub-objects of which there are descriptions in the memory.

Preferably, the animation generator receives from the server a list of the sub-objects in the object and responds by indicating to the server those sub-objects of which descriptions are not stored in the memory.

The present invention will be more fully understood from the following detailed description of the preferred embodiments thereof, taken together with the drawings in which:

DETAILED DESCRIPTION OF PREFERRED EMBODIMENTS

Figure 1:
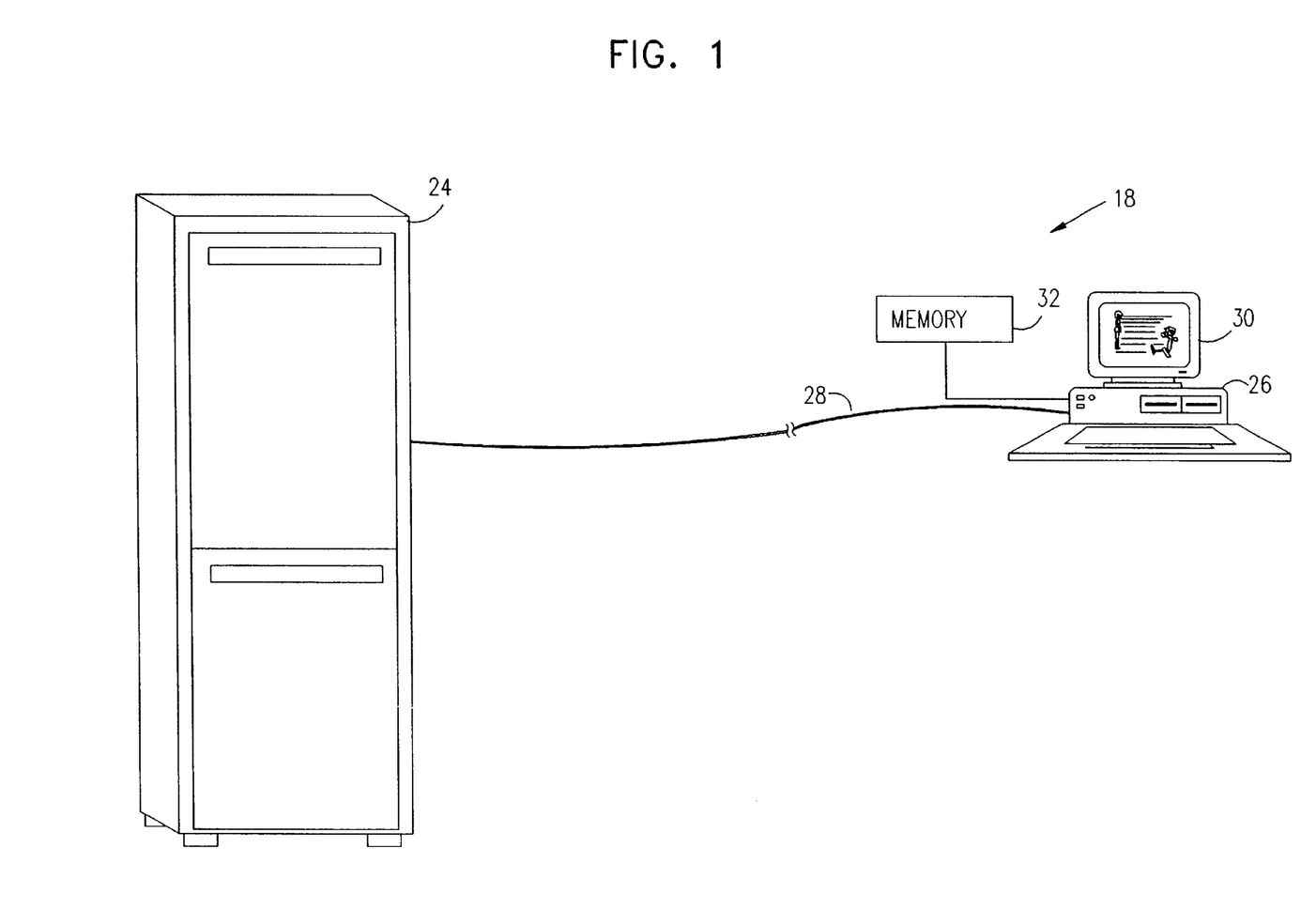
FIG. 1 is a schematic illustration of a system for rendering an animation sequence on a client computer under control of a server, in accordance with a preferred embodiment of the present invention.

FIG. 1 is a schematic illustration of a system 18 for rendering of an animation sequence, in accordance with a preferred embodiment of the present invention. The sequence is rendered on an animation generator, typically a client computer 26, under control of a server 24 connected to computer 26 by a network 28, preferably the Internet. Server 24 is preferably a Web server, as is known in the art.

The animation sequence is preferably described by a script generated in accordance with a general programming language, such as JavaScript, using computer programming methods known in the art. The animation sequence is transmitted from server 24 over a network 28 to a scene manager program, preferably associated with Internet browser software running on computer 26, as described further hereinbelow. The scene manager displays the animation on a display 30 associated with the computer. Preferably, computer 26 further comprises a memory 32 which is used to store building blocks of animation objects, referred to herein as elements, which are accessed in accordance with the script, as described hereinbelow.

Figure 2:
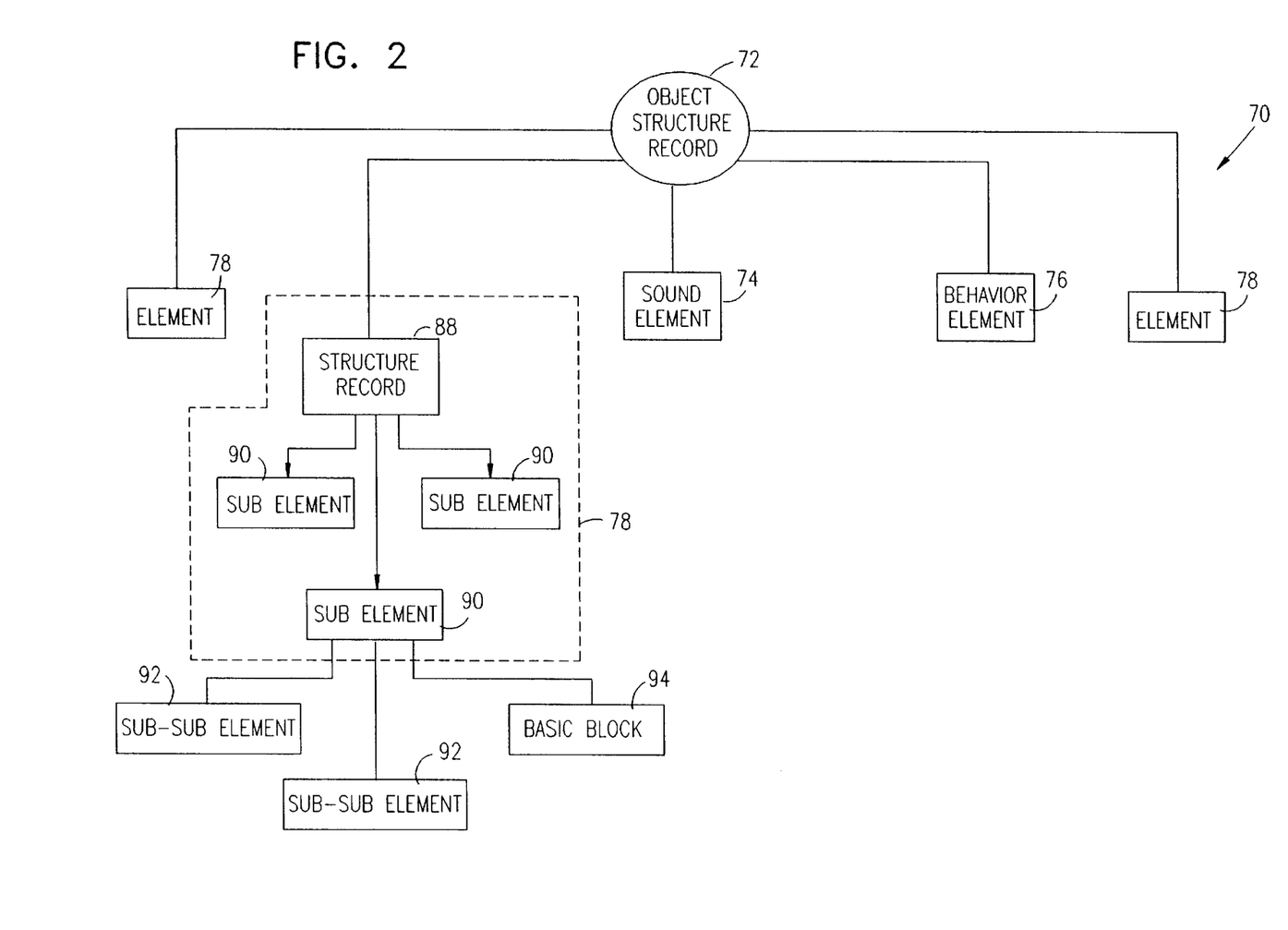
FIG. 2 is a block diagram illustrating the program structure of an animation object, in accordance with a preferred embodiment of the present invention.

FIG. 2 is a block diagram illustrating the program structure of a 3D animation object 70, in accordance with a preferred embodiment of the present invention. Object 70 comprises a plurality of elements 78, and a structure record 72 which describes relationships between the plurality of elements 78. Elements 78 may comprise "organs" which are, in general, coherent groups of 3D shapes that form a part of the physical representation of object 70. Other elements 78 include "sound elements" 74, "behavior elements" 76, "surface detail elements," and other types of groups of data associated with object 70. Elements 78 preferably are made up of a plurality of sub-elements 90 and a sub-structure 88 which describes the relationships between sub-elements 90. Preferably, at least some of sub-elements 90 are made up, in a manner similar to elements 78, of a structure element and sub-sub-elements 92. The sub-sub-elements 92 comprise further sub-elements or basic building blocks 94, such as simple geometrical shapes, single sound notes, basic behavior features, etc. Preferably, object 70 comprises a "Smart Object", as described in PCT publication WO97/35280.

Figure 3:
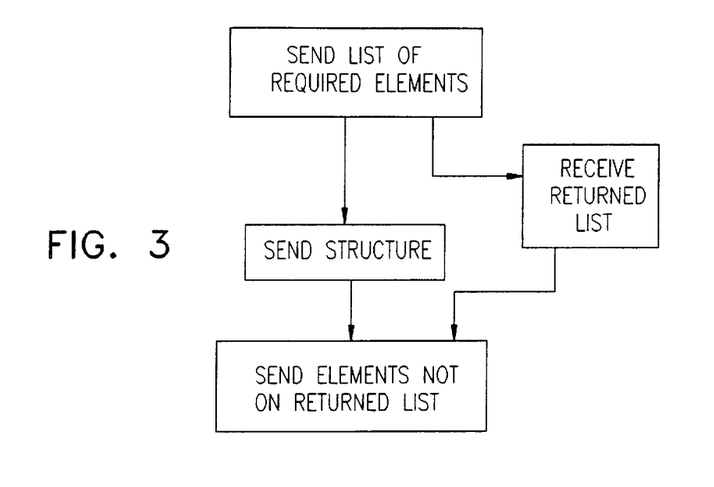
FIG. 3 is a flow chart illustrating a method of rendering an animation object, in accordance with a preferred embodiment of the present invention.

FIG. 3 is a flow chart illustrating a method of rendering animation object 70, in accordance with a preferred embodiment of the present invention. Server 24 transmits to client computer 26 a list of the elements of object 70. In response, computer 26 sends back a list of those elements which it does not have. Alternatively or additionally, computer 26 sends a list of the elements it does have. Meanwhile, server 24 sends structure record 72 to computer 26, since the structure record must be sent in any event. Preferably, if the returned list has not been received yet, server 24 continues sending elements which are most likely to be required, or elements which are chosen randomly. Once the returned list from computer 26 is received, server 24 continues sending only those elements which the computer does not have. Thus, it is possible to take advantage of substantially all the elements which are stored in computer 26, without server 24 knowing beforehand the contents of memory 32 of the computer.

In some preferred embodiments of the present invention, when an element 78 which must be sent to computer 26 includes large sub-elements 90, server 24 sends a list of the sub-elements which it intends to send, and computer 26 responds with a list of those sub-elements it does not have. This process may be continued recursively as illustrated by the pseudo code in Table 1, which is a procedure performed by server 24 when sending the elements of an object 70. The procedure is preferably invoked by the pseudo command: Handle_organ (highest organ in hierarchy).

Table 1
Procedure Handle_organ (organ_to_be_handled){
  If organ_to_be_handled exists on client
    Exit
  Else If organ_to_be_handled has sub-organs then {
    For each sub-organ of organ_to_be_handled {
      Handle_organ (the sub-organ)
    }
  Else
    Send organ to client
}

Alternatively or additionally, the original list of elements 78 of object 70 also lists all or some of the sub-elements 90 in the elements, and computer 26 indicates for those elements that it does not have in memory 32, which sub-elements it does have. It is noted that a similar procedure may be used for any depth of hierarchy of object 70.

Further alternatively or additionally, at the beginning of each session of rendering objects on computer 26 under control of server 24, the computer sends the server a list of all the elements and sub-elements it has already stored in memory 32. Thereafter, server 24 updates the list each time another object is rendered on computer 26, so that the list transmitted by the server to the computer is kept as short as possible and in some cases may not be necessary.

Figure 4:
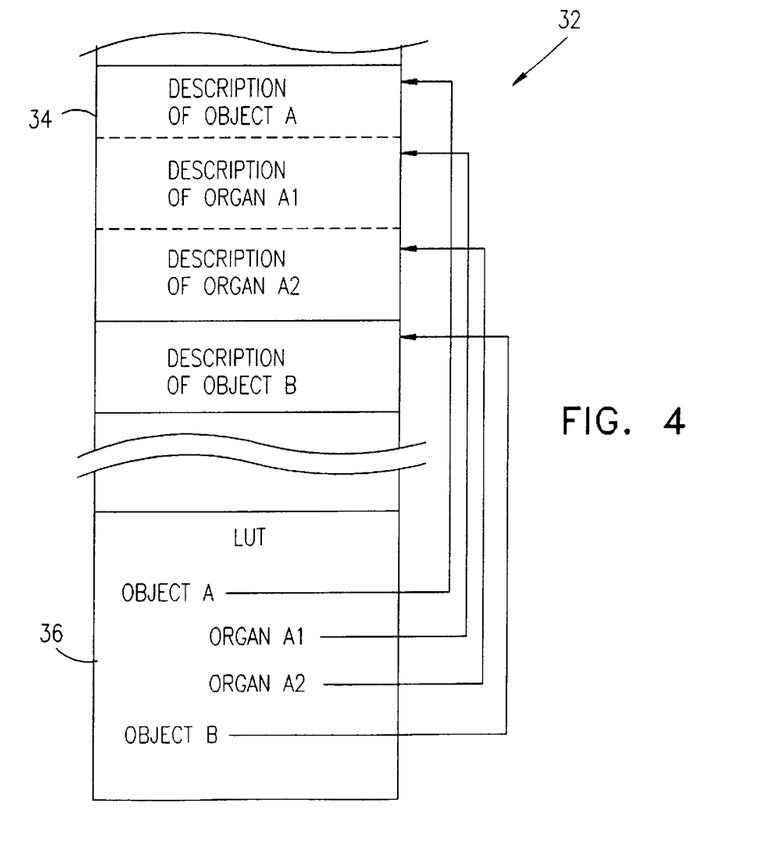
FIG. 4 is a schematic block diagram illustrating a data structure in a memory associated with the client computer, in accordance with a preferred embodiment of the present invention.

FIG. 4 is a schematic illustration of memory 32, in accordance with a preferred embodiment of the present invention. Memory 32 includes an area 34 in which descriptions of objects 70, elements 78 and sub-elements 90 are stored. Preferably, whenever any object 70, element 78, or sub-element 90 is downloaded for rendering on the screen of computer 26, it is in addition stored in memory 32 for further use. Alternatively or additionally, a group of commonly-used objects and/or elements are provided along with the browser. Further alternatively or additionally, a group of commonly used objects and/or elements are stored in memory 32 upon manufacture, and are provided to every purchaser of computer 26. Further alternatively or additionally, a user may download from an Internet site groups of objects and/or elements.

Preferably, memory 32 comprises a look-up table 36 which points to the location in area 34 of each object, element and sub-element stored in memory 32. When computer 26 receives a list of objects from server 24, it compares the list to look-up table 36 and responds accordingly.

Thereafter, when the browser displays object 70, it accesses look-up table 36 to determine the location of elements it needs for rendering.

Preferably, elements 78 are cataloged in look up table 36 both as elements and according to their sub-elements, so that sub-elements included in more than one element need be sent for rendering only once.

Figure 5:
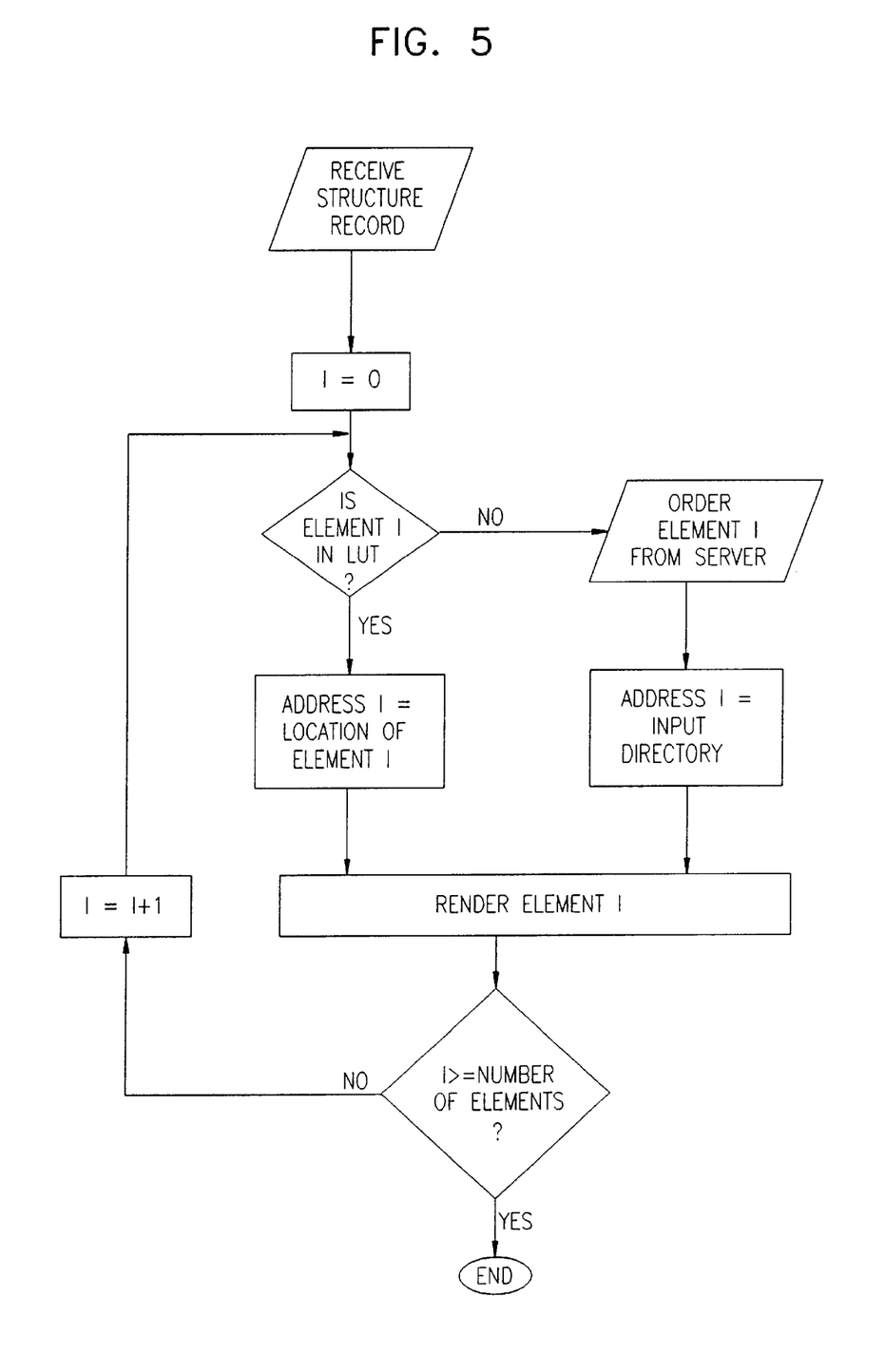
FIG. 5 is a flow chart illustrating the actions of a computer in rendering an object under control of a remote server, in accordance with another preferred embodiment of the present invention.

FIG. 5 is a flow chart illustrating the actions of computer 26 during rendering of object 70, in accordance with another preferred embodiment of the present invention. Object 70 is sent in the form of a script to a Web browser on computer 26. The script includes structure record 72 of object 70, in which the elements of the object are referenced along with the connections between them. The browser renders the elements on display 30, as is known in the art. For each element to be rendered, the browser calls an element manager which provides the address of the description of the element.

Preferably, the element manager is stored in memory 32 together with the descriptions of the objects. Preferably, the element manager is an ActiveX element and is provided with the Web browser, with an operating system or with computer 26. Alternatively or additionally, the element manager may be downloaded from a Web site or is provided along with an animation stream.

The element manager preferably consults look-up table 36 to find the element. If the element is in memory 32, the element manager returns a pointer to the exact area 34 where the description of the element resides. Providing the exact address of the element allows the script from server 24 to access the element directly without searching through memory 32, a search which generally causes the Web browser to display an alert message. However, if the element is not in memory 32 the element manager returns a pointer to an input directory in which elements from server 24 are temporarily stored. In addition, the element manager preferably orders the element from server 24, by sending an appropriate message. Preferably, if the element is formed of relatively large sub-elements, and some of the sub-elements are stored in memory 32 (as listed in LUT 36), the element manager orders only those elements which are not in the memory.

After the element manager has ordered one of the elements from server 24, computer 26 waits for the server to return the ordered element. Preferably, while the computer is waiting, the element manager proceeds to process the rest of structure record 72. Alternatively, the element manager waits for the ordered element to be returned before proceeding.

Table 2 is a subroutine which finds the objects referenced by the structure record, in accordance with a preferred embodiment of the present invention.

Table 2

```
//*****************************************
****************
// da—DirectAnimation object for creating parts
// number_of_parts—the number of parts in the character
// alternate path—the path where all parts will reside if
// not found in local users hard disk
// characterURLs—array with entry for each part.
// If entry is "", no part is needed.
// If entry is "?", part can be found only in
// alternatePath, and not on user's local hard disk.
// otherwise, points to relative path of part in Zapa's
// folder on user's local hard disk.
//*****************************************
****************
function ZapaCreateCharacter (da, number_of_parts,
   alternatePath, characterURLs)
{
   // create ActiveX object that searches for local content
   // Zapa.LocalContent is the element manager var
   zapaContents=new
   ActiveXObject("Zapa.LocalContent");
   // array that will receive DA parts
   var allParts=new Array(skeleton.length);

var i;

// in Zapa's characters, base part is always a null part
      allParts[0]=da.EmptyGeometry;

for (i=1; i<=number_of_parts; ++i)
      {
         var localFileName=characterURLs[i-1];
         // alternate filename is as below.
         var alternateFileName=alternatePath+i+".x";

if (localFileName =="")
            // if part i is an empty part
            allParts[i]=da.EmptyGeometry;
         else if (zapaContents !=null && localFileName !="?")
         {
         // if part may be in local content and activeX object
            // was created correctly, ask it for local path
            var path=zapaContents.PathOfFile(localFileName,
               alternateFileName);

// ActiveX returns either local file name or alternate
               file name
               if(path !="")
                  allParts[i]=da.ImportGeometryAsync(path,
                     da.EmptyGeometry).Geometry;
               else
                  allparts[i]=da.EmptyGeometry;
         }
         else
         // if no local content, then just use alternateFileName
         allParts[i]=
            da.ImportGeometryAsync(alternateFileName,
               da.EmptyGeometry).Geometry;
```

Thereafter, the elements received from server 24 are preferably passed to long-term storage in memory 32 in appropriate directories. In addition, the elements are preferably cataloged in list 36. The long term storage is preferably performed at a later time when computer 26 is idle. Alternatively or additionally, elements which appear more than once in an animation stream or are likely to appear in animation streams to be accessed in the future are placed in the long-term storage while the rest of the elements received are left in the temporary directory and are eventually erased. Preferably, each element sent from server 24 is tagged with a "store"/"don't store" label, which instructs computer 26 whether to pass the element to long term storage.

Alternatively or additionally, the elements are tagged with a priority value which states the expected frequency of use of the element. Computer 26 determines, based on the priority value and the available storage room in memory 32, whether or not to pass the element to the long-term storage. Preferably, other variables may also be used to determine whether to pass the element to long-term storage, and a user of computer 26 may change the settings of the variables.

It will be appreciated that the preferred embodiments described above are cited by way of example, and the full scope of the invention is limited only by the claims.

What is claimed is:

1. A method for rendering an animation object, including a plurality of sub-objects each represented by a respective program description, on a display of a client computer under control of a remote server, comprising:

transferring from the server to the client, program code which describes a structure of the animation object, the code comprising an identification of the sub-objects included in the animation object;

sending a message from an element manager on the client to the server in response to the program code, indicative of at least a first one of the sub-objects whose program description is already stored in a local memory associated with the client;

responsive to the message, conveying from the server to the client the program description of at least a second one of the sub-objects, whose program description is not stored in the local memory associated with the client;

accessing within a local memory associated with the client the program description of the at least first one of the sub-objects of the animation object; and displaying the animation object such that the at least first and second sub-objects are coupled to the structure in accordance with the program code.

2. The method according to claim 1, wherein sending the message comprises reporting to the server the identity of at least the first sub-object whose program description is stored in the memory.

3. The method according to claim 1, wherein at least some of the sub-objects comprise sub-sub-objects, and wherein conveying the program description of at least the second sub-object comprises transferring only those sub-sub-objects of the second sub-object not stored in the memory.

4. The method according to claim 1, and comprising storing in the memory a plurality of descriptions of sub-objects when installing a browser on the computer.

5. The method according to claim 1, wherein accessing the program description comprises looking up the location of the description in the memory in a look-up table.

6. The method according to claim 1, wherein accessing the program description comprises receiving an exact location of the description from an element manager and accessing the exact location.

7. The method according to claim 1, wherein the animation object comprises a three dimensional graphical object.

8. The method according to claim 1, wherein at least some of the sub-objects comprise graphical descriptions of parts of the animation object.

9. The method according to claim 1, wherein at least some of the sub-objects comprise sound modules.

10. The method according to claim 1, wherein accessing the program description of the at least first one of the sub-objects comprises calling a routine which returns the address of the object in the local memory.

11. The method according to claim 1, wherein transferring the program code comprises transferring a script which references the sub-objects in the local memory and if the object is not found in the local memory, references the sub-object in an input location.

12. Apparatus for rendering an image of an animation object under control of a remote server, comprising:

a memory, which stores respective program descriptions of sub-objects which are used to form the objects;

an animation generator, linked locally to the memory, which receives over a network from a server a skeleton which describes a structure of the object and which comprises an identification of the sub-objects included in the object, and which sends a message to the server in response to the identification of the sub-objects indicative of at least a first one of the sub-objects whose program description is already stored in the memory, so that responsive to the message, the server sends to the animation generator the program description of at least a second one of the sub-objects, whose program description is not stored in the memory, and which retrieves the descriptions of the at least first one of the sub-objects from the memory; and a display on which the image is displayed by rendering the at least first and second sub-objects responsive to the descriptions thereof and responsive to the skeleton.

13. The apparatus according to claim 12, wherein the object comprises a three dimensional object.

14. The apparatus according to claim 12, wherein the memory comprises a look up table which lists the sub-objects of which there are descriptions in the memory.

15. The apparatus according to claim 12, wherein the animation generator receives from the server a list of the sub-objects in the object and responds by indicating to the server those sub-objects whose program descriptions are not stored in the memory.

* * * * *